United States Patent [19]

Reber

[11] 3,965,937

[45] June 29, 1976

[54] WASHBASIN FAUCET INSTALLATION WITH AUXILIARY FITTING FOR MOUTH SPRAY OR SIMILAR APPARATUS

[76] Inventor: Martin Reber, 7 Cours de Rive, Geneva, Switzerland

[22] Filed: Apr. 16, 1975

[21] Appl. No.: 568,392

[30] Foreign Application Priority Data
Apr. 18, 1974 Switzerland.......................... 5336/74

[52] U.S. Cl.......................... 137/625.47; 137/612.1
[51] Int. Cl.²....................................... F16K 11/085
[58] Field of Search ........ 137/118, 119, 610, 612.1, 137/625.47; 239/25; 222/318

[56] References Cited
UNITED STATES PATENTS
1,075,373   10/1913   Page ..................................... 239/25

*Primary Examiner*—Henry T. Klinksiek
*Attorney, Agent, or Firm*—Kurt Kelman

[57] ABSTRACT

A two-way cock in a faucet permits water to be directed either into a main outlet or a branch outlet. The main outlet leads to a main water spout and the branch outlet leads to a compartment which communicates, on the one hand, with an auxiliary water spout serving for the attachment of a flexible tube, and, on the other hand, with another compartment housing a spring-biased pressure limiting valve. The valve normally closes communication between the two compartments but excess pressure in the one compartment opens the valve and permits water to enter into the other compartment whence it is permitted to flow into the main outlet in response to the excess pressure.

4 Claims, 3 Drawing Figures

U.S. Patent   June 29, 1976   3,965,937
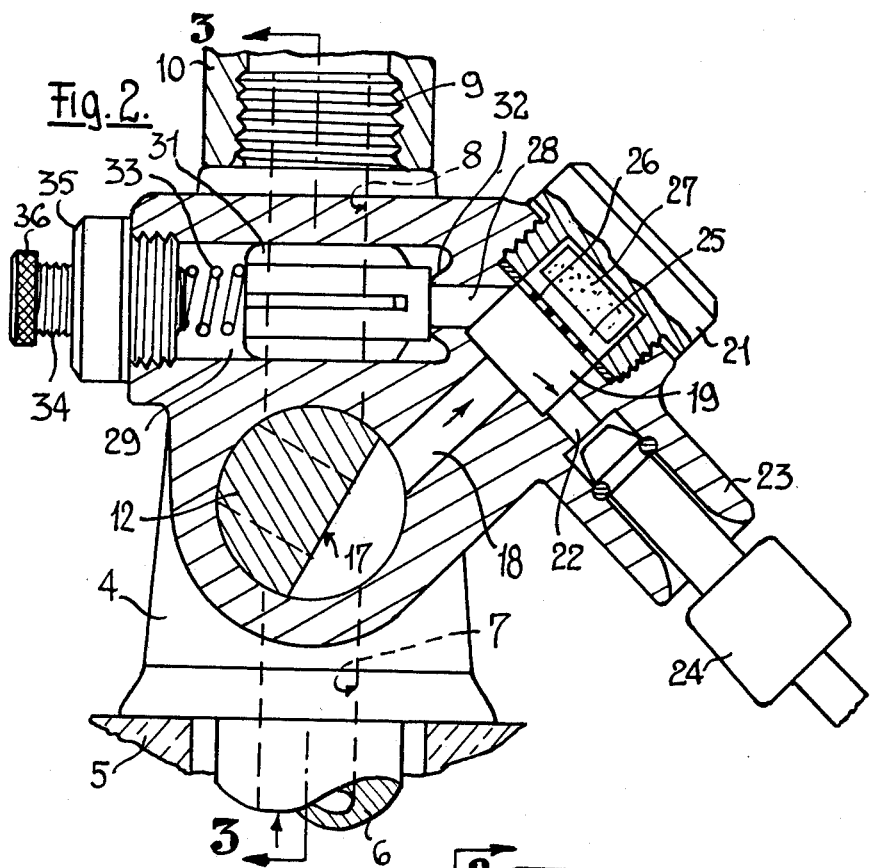
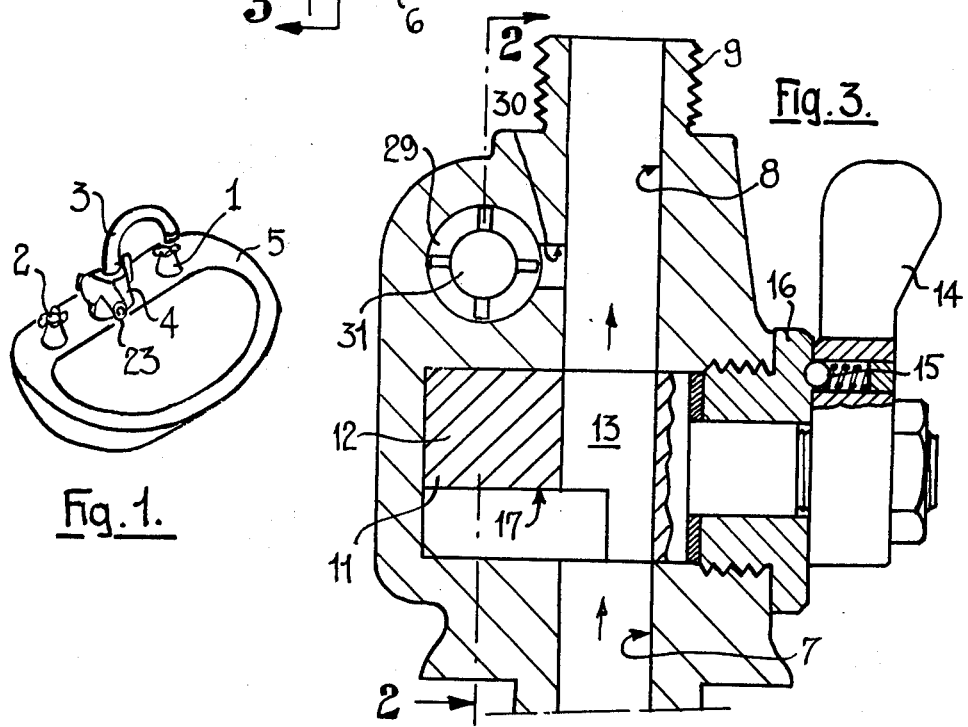

WASHBASIN FAUCET INSTALLATION WITH AUXILIARY FITTING FOR MOUTH SPRAY OR SIMILAR APPARATUS

The object of this invention is a faucet for a washbasin which contains an auxiliary fitting for connecting an apparatus such as a mouth spray, for example.

In order to permit the supply of water to such auxiliary apparatus, it is proposed to fix upon the end of the faucet a fitting which contains a branch conduit and means by which a connection can be made whenever desired either with the faucet which empties into the sink or with this branch conduit to enable the operation of the auxiliary apparatus, mouth spray, massage apparatus, etc.

Those fittings presently known which are fixed at the end of the faucet are in general clumsy and not very esthetic. Besides, they present certain inconveniences which make their use difficult for they are composed of two-way faucets which do not permit precise regulation of the pressure which feeds the auxiliary apparatus. They also make it difficult to regulate the temperature of water supplied.

The invention aims to offer an improved faucet installation for a washbasin provided with an auxiliary fitting which will permit the functioning of mouth sprays and other similar apparatus under the best conditions.

This faucet is characterized by the fact that it consists of a two-channel faucet permitting the supply of water at will from a single source entry conduit, a conduit to the main faucet or a deviating conduit terminating in an auxiliary connection, this deviation conduit communicating with the conduit of the main outlet by a reversing channel supplied with a fixed high-pressure valve to limit the maximum pressure to the auxiliary connection.

The drawing represents, as an example, an embodiment this invention.

FIG. 1 is a perspective view of a washbasin equipped with a hidden unit containing a central mixing faucet with a goose-neck.

FIG. 2 is a partial sectional view of this installation along line 2—2 of FIG. 3.

FIG. 3 is a cross section along line 3—3 of FIG. 2.

The washbasin represented in FIG. 1 consists of a hidden mixing unit containing a cold water channel 1 and a hot water channel 2 feeding a central common goose-neck faucet 3.

This central faucet consists of a support-base 4 mounted on the porcelain basin 5 (FIG. 2) and containing a tube 6 ending with an extension in T-form, not shown, attached to the cold and hot water channels.

The support-base is pierced by inlet conduit 7 in alignment with the conduit constituted by tube 6 and which leads into cock-casing 11. In the alignment with conduit 7 the support-base is pierced by a main outlet conduit 8 which leads into upper extension 9 onto which is mounted the goose-neck spout 10 (FIG. 2).

The cock-casing 11 houses cock body 12 pierced by a diametrical conduit 13 which, in a first angular position represented in FIG. 3, is aligned with the conduits 7 and 8 to assure the direct passage of the water towards spout 8. The casing 11 has a knob 14 and its angular position is indexed by a spring-biased ball 15 partially engaged in a corresponding recess in a plug 16.

The body 12 extends beyond conduit 13 (FIG. 3) and has a notch 17 of which a right hand part can communicate with inlet conduit 7. In a second angular position of the cock body represented in FIG. 2, this notch 17 establishes communication between inlet conduit 7 and a branch conduit 18 while at disconnecting same time the conduit 13 from main outlet 8.

Branch conduit 18 empties into a compartment 19 closed by a removable plug 21 and whence leads auxiliary outlet channel 22 of auxiliary faucet 23 set at a 45 degree angle above the washbasin. This auxiliary faucet 23 is actually an outlet permitting the attachment of a flexible tube 24 serving to supply an auxiliary apparatus such as a mouth spray for example.

The plug 21 has a compartment 25 delimited by mesh 26 to hold a soluble tablet 27 which dissolves slowly in the flow of water moving towards the auxiliary outlet.

The compartment 19 also communicates through return channel 28 with a valved compartment 29 which itself communicates by a conduit 30 with the outlet conduit 8 leading to the goose-neck spout.

A high-pressure valve 31 housed in this compartment 29 is held against a center 32 formed at the mouth of the channel 28 by a spring 33 which depends for its pressure on an adjustable stop formed by the end of a screw 34 screwed into a plug 35.

Thus this fixed high-pressure valve 31 limits the allowable pressure in the compartment 19 and also the flow to the auxiliary outlet 23, any water overflow determined by the amount of water coming from the two channels 1 and 2 being automatically diverted towards the goose-neck spout.

By changing the position of the pressure screw 34 which has a knurled knob 36 one can regulate the pressure at the auxiliary outlet.

The faucet shown has the following advantages:

Outlet 23 serves as an available water discharge to feed auxiliary apparatus at a desired reduced pressure, thus avoiding all overloading of flexible extension tubes even if the auxiliary apparatus has a stop device permitting the functioning of the tube under pressure.

Regulating the temperature is done more easily by the two main channels of the hot and cold water conduits practically without changing the flow to the auxiliary apparatus which is determined by regulating the high-pressure valve 31.

When a mouth spray is attached the parallel outflow of water to the main outlet allows the washbasin to be kept clean through permanent rinsing by a greater flow of water.

Finally, the support-base 4 can easily be mounted in the same place as the basic support of the usual central faucets thus permitting the adaptation of existing washbasins to the use of mouth sprays and other similar apparatus.

I claim:

1. A faucet for a washbasin, comprising
   1. a support base defining a water inlet conduit,
   2. a two-way cock mounted on the support base and comprising
      a. a cock casing defining a chamber arranged to receive water from the inlet conduit, a main water outlet conduit and a branch water outlet conduit leading from the cock casing chamber,
      b. a cock body movably mounted in the cock casing chamber between the inlet conduit and the outlet conduits, the cock body being movable into respective angular positions to establish communication between the inlet and main outlet conduits, and the inlet and branch outlet conduits, respectively,
c. the branch outlet conduit leading from the cock casing chamber to a first compartment in the casing and the casing defining two channels leading away from the compartment, and
d. the cock casing defining a second compartment in communication with one of the channels, a spring-biased pressure limiting valve housed in the second compartment and normally closing communication between the one channel and the second compartment, excess pressure in the one channel opening the valve and permitting water to enter from the one channel into the second compartment, and the cock casing defining a third channel between the second compartment and the main water outlet conduit to permit water from the second compartment to flow into the main outlet conduit in response to said excess pressure,
3. a main water spout directed into the washbasin and in communication with the main water outlet conduit, and
4. an auxiliary water spout in communication with a second one of the two channels, the auxiliary spout serving for the attachment of a flexible tubing.

2. The faucet of claim 1, further comprising an upper extension on the support base, the main water outlet leading to the upper extension, and the main water spout being a goose-neck spout mounted on the extension.

3. The faucet of claim 1, further comprising set screw means for regulating the spring bias of the valve, the second compartment having an opening spaced from the one channel, a plug in the opening for closing the compartment, and the set screw being mounted in the plug.

4. The faucet of claim 1, the first compartment having an opening, a removable plug mounted in the opening for closing the first compartment, the removable plug defining a cavity for housing a water-soluble tablet adapted to dissolve in the water flowing through the first compartment.

* * * * *